United States Patent [19]
He

[11] Patent Number: 6,032,992
[45] Date of Patent: Mar. 7, 2000

[54] AUTOMOBILE AUTOMATIC SAFETY PROTECTOR

[75] Inventor: Liangcai He, Yiyang, China

[73] Assignee: Hongjian Zhang, Changsha, China

[21] Appl. No.: 09/034,307

[22] Filed: Mar. 3, 1998

[30] Foreign Application Priority Data

Apr. 1, 1997 [CN] China ................................ 97 2 08274

[51] Int. Cl.[7] .................................................. B60R 19/02
[52] U.S. Cl. ................................ 293/2; 180/277; 180/275
[58] Field of Search ........................ 293/2, 3, 4; 180/274, 180/275, 277

[56] References Cited

U.S. PATENT DOCUMENTS

| | | | |
|---|---|---|---|
| 1,197,417 | 9/1916 | Welch | 180/275 |
| 1,850,744 | 3/1932 | Trapani | 180/277 |
| 1,996,528 | 4/1935 | Smith | 293/2 X |
| 4,105,237 | 8/1978 | Viall, Sr. et al. | 293/2 X |
| 4,635,982 | 1/1987 | Feldmann et al. | 293/2 |
| 5,213,383 | 5/1993 | Muselli et al. | 293/2 |

FOREIGN PATENT DOCUMENTS

| | | | |
|---|---|---|---|
| 2 063 907 | 10/1990 | China . | |
| 1 108 192 | 9/1995 | China . | |
| 276154 | 12/1930 | Italy | 293/2 |

*Primary Examiner*—Joseph D. Pape
*Attorney, Agent, or Firm*—Lydon & Brown, LLP

[57] ABSTRACT

An automatic safety protector relates to a safety protecting device for a traveling motor vehicle. It is installed with a set of automatic flameout, braking mechanisms in front of the head of a motor vehicle, and a shock absorbing device is mounted between a fender-guard and a frame side member. When motor vehicle is in collision, the former realize automatic flameout and braking, and the latter buffers the impact force on collision, thereby the loss due to a collision accident is minimized.

11 Claims, 4 Drawing Sheets

AUTOMOBILE AUTOMATIC SAFETY PROTECTOR

BACKGROUND OF THE INVENTION

The invention relates to a automatic safety protecting device of a traveling motor vehicle.

Motor vehicles are the most common means of transportation at this time. Along with unceasing society development, motor vehicles are not only means of service in highway transportation, but they are also popularizing to families and individuals, more and more motor vehicles are traveling on highways. Followed traffic accidents are getting worse and worse, in which the most of them are traffic collision accidents. Consequently, an astonishing member of vehicular homicides result. Prevailing vehicles, especially trucks, have fender-guards installed at the headers. However, they are in rigid connection with the bodyworks, which cannot take effect for protection in collision accidents. Thus the impact forces exert directly on the vehicles and produce destruction, and personal casualties follow concurrently.

SUMMARY OF THE INVENTION

The object of the invention is providing a type of automatic safety protector for motor vehicle. This Protector may realize automatic flameout and braking for traveling vehicles in collision simultaneously and buffers the impact force, thus the accident loss is minimized.

The technical solution of the invention comprises: first, set up an automatic flameout and braking mechanism in front of the head of the vehicle consisting of a sensitive lever, a telescopic strut, a connecting rod, a push rod, a pull rod, a connecting rod shaft and cables etc., the mechanism may achieve immediate flameout and braking on vehicle collision; second, a shock absorbing device is installed between the fender-guard and the frame side member to buffer the impact force on vehicular collision, and minimize the action force on the vehicle. The aforesaid mechanism and devices are both installed on the frame side member. Therefore at the emergence of vehicular collision, flameout, braking and shock absorbing are put into effect concurrently, thereby achieved automatic safety protection.

Due to adoption of the above mentioned technical solution, the object of the invention is realized, this automatic safety protector for motor vehicle accomplished automatic flameout, automatic braking and impact force buffering in traffic collision, in which flameout cuts off the power producer, braking stopped the wheel rolling, buffered the collision, reduced the inertial force of the vehicle, thereby protected the vehicles.

DETAILED DESCRIPTION OF THE PREFERRED EMBODIMENTS

Figure 1:
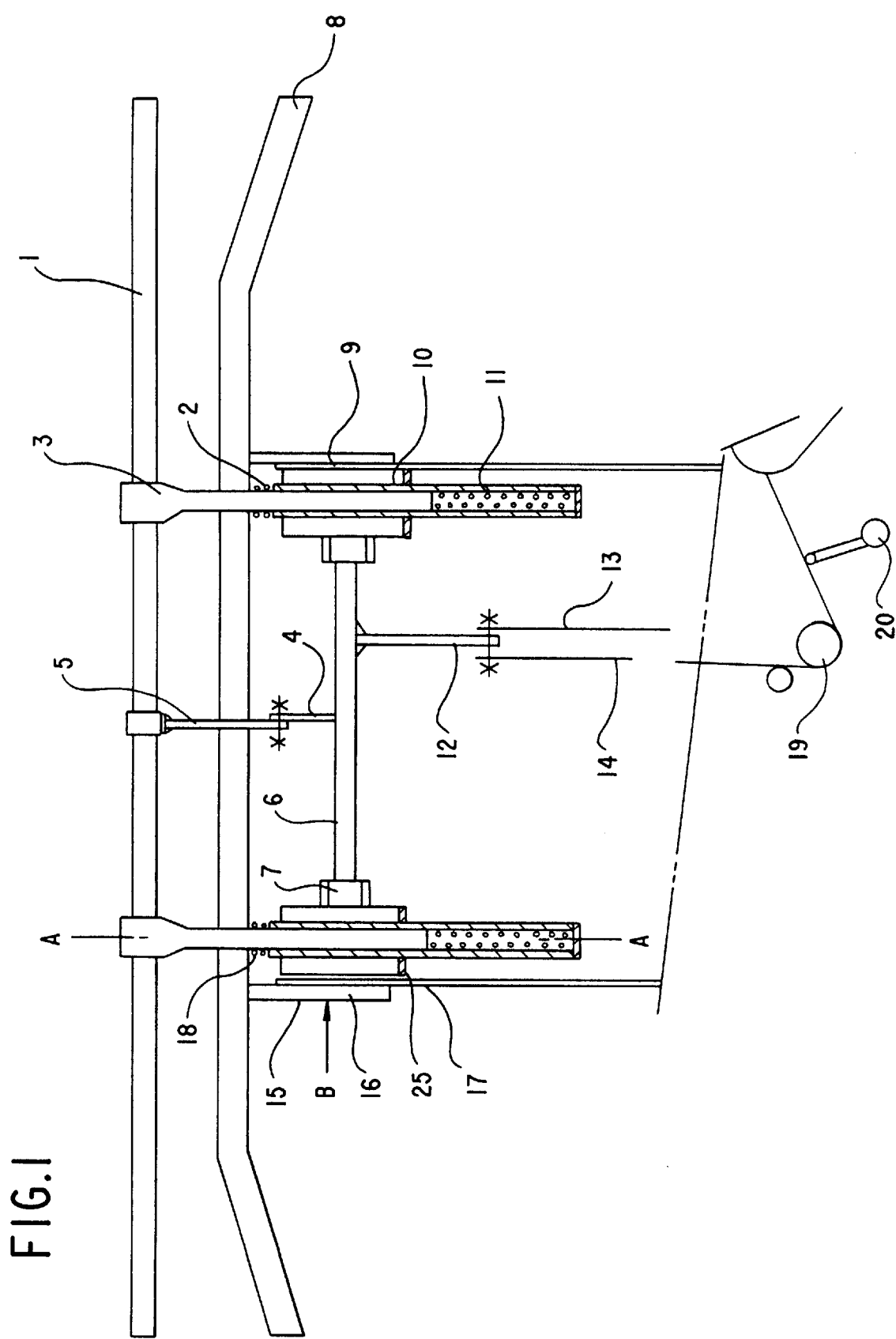
FIG. 1 is a structural schematic diagram (floor plan) of the invention.
Figure 2:
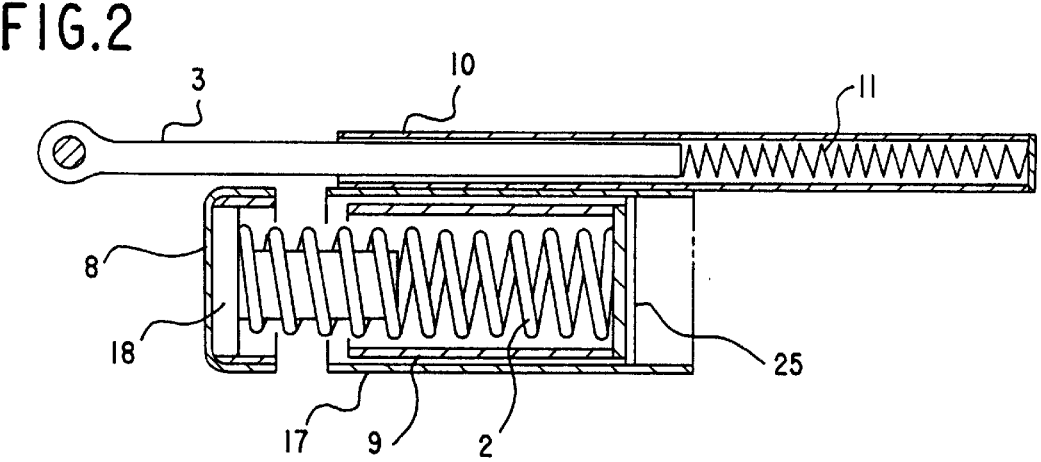
FIG. 2 is a section view taken along A—A direction in FIG. 1.
Figure 6:
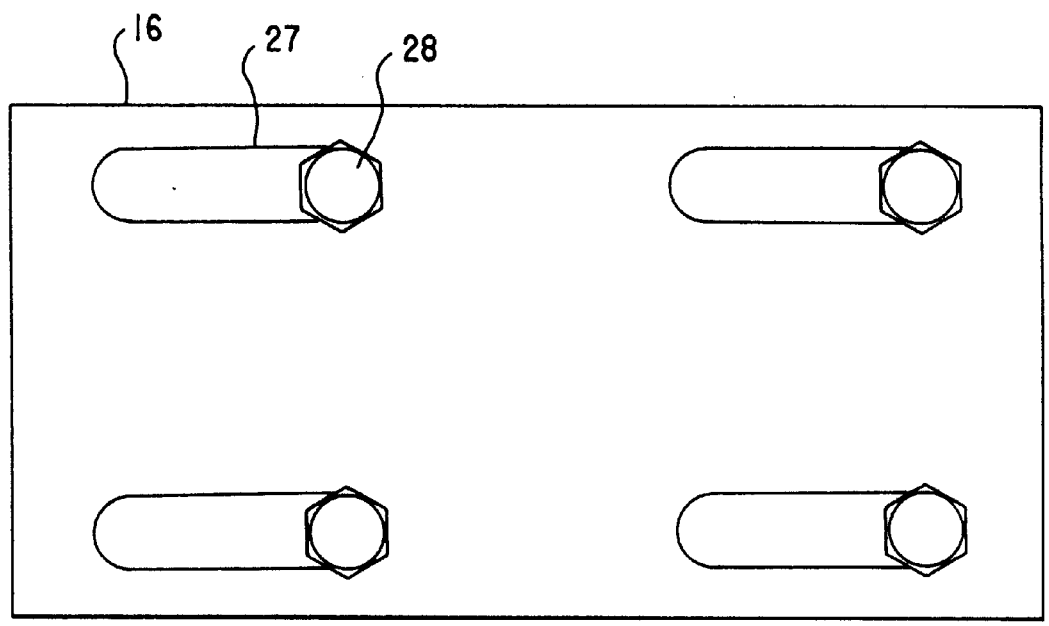
FIG. 6 is a schematic diagram of a supporting slide plate 16 taken along B direction.
Figure 7:
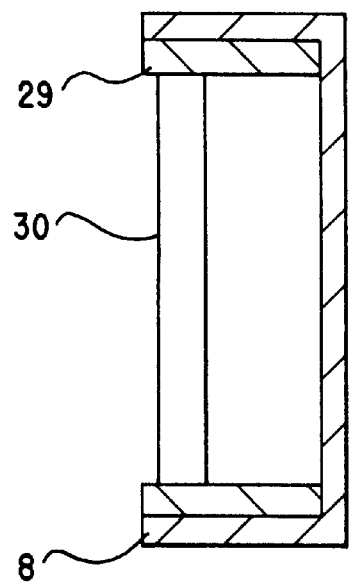
FIG. 7 is a section schematic view of a reinforced fender-guard 8.

The preferred embodiment of the invention is described in the drawings. As shown in FIG. 1, in front of two frame side members 17 and fender-guard 8, a flameout and braking mechanism is installed, which may accomplish immediate flameout and braking on vehicular collision, and a shock absorbing device is mounted between fender-guard 8 and frame side member 17, to buffer the impact force on vehicular collision. Specifically, sensitive lever 1 is supported in front of fender-guard 8 via two telescopic struts 3, when an object, for example, a vehicle is collided, the sensitive lever 1 contacts in prior, and brings the telescopic struts 3 into backward contraction. At the same time, push rod 5 fastened on sensitive lever 1 pushes the connecting rod 4 backwards, since connecting rod 4 and push rod 5 are movably hinged, connecting rod 4 revolves around connecting rod shaft 6. Whereas connecting rod 4 and connecting rod shaft 6 are rigidly connecting, so that connecting rod shaft 6 also performs revolution concurrently. Pull rod 12 rigidly connected with connecting rod shaft 6 also revolves around connecting rod shaft 6, thus will cause cables 13 and 14 which are fastened on one end of pull rod 12 to pull forwards. Throttle cable 13 shall shut off the gas, and braking pedal cable 14 pulls the pedal via steering wheel 19 and strut 20 mounted on the frame side member to realize braking. Said telescopic strut 3 is mounted in telescopic strut bushing 10 containing a coiled spring 11, and telescopic strut bushing 10 is welded on frame side member 17, as shown in FIG. 2. Said shock absorbing device includes a fender-guard 8, a shock absorber spring 2, a shock absorber spring bushing 9 and a shock absorbing seat 18, its fender-guard 8 is reinforced. As shown in FIG. 7, at the top and bottom of the inside of fender-guard 8, a piece of reinforced steel plate 29 is internally welded respectively, with struts 30 installed at both ends. A base of shock absorbing seat 18 is inlaid in fender-guard 8, while shock absorber spring bushing 9 is embedded in a groove at the front end of frame side member 17. Shock absorber spring 2 is covered on shock absorbing seat 18, and mounted inside in shock absorber spring bushing 9. A piece of reinforced steel plate 25 is welded on the back end of shock absorber spring bushing 9, whilst fender-guard 8 connects with frame side member 17 via support slide plate 16. As shown in FIG. 6, 4 long slots 27 with round shaped ends are engraved on support slide plate 16, said slide plate 16 connects with frame side member 17 by 4 sets of bolts and nuts 28, and another end of support slide plate 16 is welded on fender-guard 8. When an extremely serious collision occurred between vehicles and bumped on fender-guard 8, support slide plate 16 of fender-guard 8 slides backwards, shock absorber spring 2 is compressed, which enables the impact to be buffered. Alternatively, 3 slots 27 in triangular arrangement may also be engraved on said support slide plate 16, which connects with frame side member 17 by 3 sets of screws and nuts 28.

Figure 3:
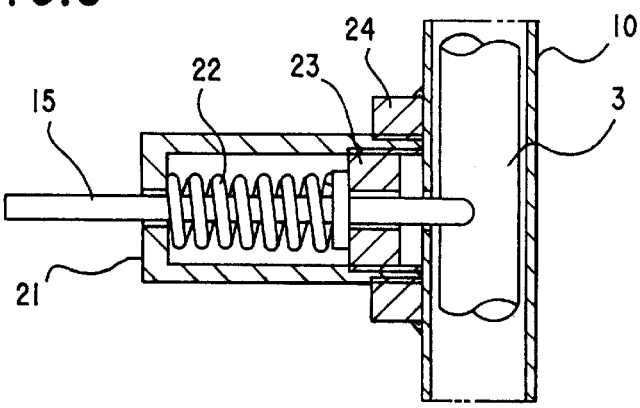
FIG. 3 is a structural schematic diagram of a telescopic strut locking pin in FIG. 1.
Figure 4:
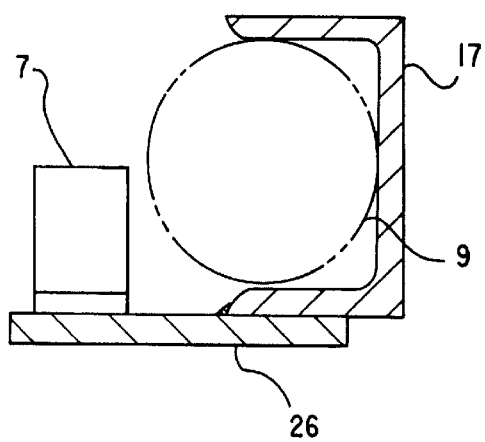
FIG. 4 is a structural schematic diagram showing the relation of a connecting rod shaft seat 7 and frame side member.
Figure 5:
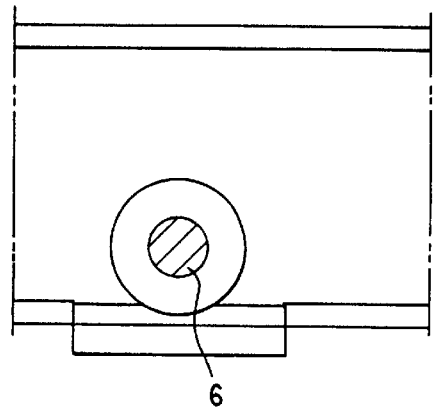
FIG. 5 is a left view of FIG. 4.

In order to ensure automatic flameout and braking on collision, a telescopic strut locking pin 15 is installed at the forepart of telescopic strut bushing 10, its structure is illustrated in FIG. 3. A Coil spring 22 is set up in pin bushing 21 and then a locking pin 15 is introduced thereinto, and a screw plug 23 is twisted thereinto. Then twist the whole set of locking pin into locking pin seat 24 fastened on telescopic strut bushing 10. Locking pin 15 is a pin provided with a shaft shoulder in its middle part, because of the shaft shoulder and coil spring 22, thus the locking pin is retractable. When telescopic strut 3 is contracted to an extreme position, since a pin hole is bored on the corresponding position of telescopic strut 3 to locking pin 15, thus when telescopic strut 3 is compressed into an extreme position on vehicle collision, locking pin 15 is pinned automatically into the pin hole of telescopic strut 3 under the action of coil spring 22 to ensure braking.

Both ends of aforesaid connecting rod shaft 6 are mounted on connecting rod shaft seats 7 respectively. The bearings of the shaft seats are conventional sliding bearings. The shaft seat is fastened on a base board 26 of connecting rod shaft seat by screws and nuts, and base board 26 is welded on the bottom surface of frame side member.

Figure 8:
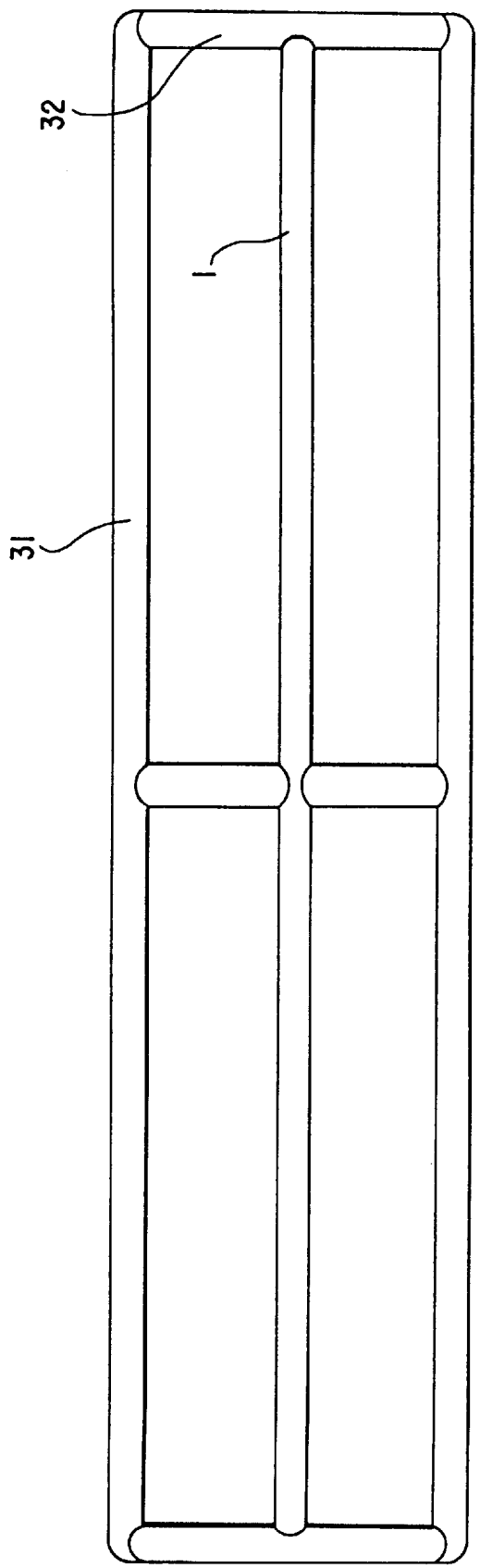
FIG. 8 is a view of a compound rod for sensitive lever 1 having overarms 31 on top and bottom respectively and linked together with montants 32.

Aforesaid sensitive lever 1 may be a single rod. In order to meet the broadened impact force appropriately, it may be made into a compound rod, as shown in FIG. 8. So called compound rod, is to add overarms 31 on top and bottom respectively, and linked together with 2–6 montants 32 to form a rectangular sensitive frame. Thus the impact contact surface is broadened, and safety protection is further guaranteed.

I claim:

1. An automatic safety protector for a motor vehicle having a throttle and a brake, comprising a frame side member, a fender-guard mounted at a front end of the motor vehicle;

a flameout and braking mechanism mounted at a front end of the vehicle for achieving immediate flameout and braking on a collision of the vehicle with an object, said flameout and braking mechanism comprising a sensitive lever mounted in front of said fender-guard by at least one telescopic strut; and a push rod having one end connected to said sensitive lever and the other end operatively joined to a first cable operatively connected to a throttle of said motor vehicle, and said other end also being operatively to a second cable operatively connected to a brake of said motor vehicle, such that the brake will be engaged and the throttle will be closed by action of a collision force upon said sensitive lever;

a shock absorbing device installed between the fender-guard and the frame side member to buffer a collision force on occurrence of a collision of the vehicle with an object, said shock absorbing device comprising a shock absorber spring having two ends, with a front end being mounted against a rear surface of said fender-guard, and a rear end of said spring being mounted in a shock absorber spring bushing mounted at a front end of the frame side member, such that upon collision of the front of the vehicle with an object, the telescopic strut will move from an extended position to a contracted position upon the urging of the sensitive lever and against the shock absorber spring, thereby buffering a collision force.

2. The automatic safety protector of claim 1, wherein a rear end of said shock absorber spring bushing is mounted against a reinforced plate.

3. The automatic safety protector of claim 1, wherein said sensitive lever is mounted in front of said fender-guard by at least two telescopic struts.

4. The automatic safety protector of claim 1, wherein said push rod is operatively joined to said first cable by a connecting rod shaft rotatably and transversely mounted behind said fender guard, such that upon transmission of a collision force from said push rod, the connecting rod will rotate about an axis, thereby acting upon said throttle and said brake through said first and second cables.

5. The automatic safety protector of claim 4, wherein said push rod is joined to said connecting rod shaft by a connecting rod.

6. The automatic safety protector of claim 1, wherein said fender-guard and said frame side member are connected by a slide plate.

7. The automatic safety protector of claim 6, wherein said slide plate has at least 3 long slots having round shaped ends, said slide plate being connected to said frame side member by at least 3 sets of bolts and nuts, and the other end of said slide plate is welded to said fender-guard.

8. The automatic safety protector of claim 1, wherein said telescopic strut bushing contains a coiled spring.

9. The automatic safety protector of claim 1, wherein a telescopic strut locking pin is mounted at a forepart of a telescopic strut bushing, and a pin receiving hole is bored at a corresponding extreme contracted position of said telescopic strut to said locking pin.

10. The automatic safety protector of claim 4, wherein said connecting rod shaft is installed between two frame side members.

11. The automatic safety protector of claim 1, wherein said sensitive lever is a compound rod.

\* \* \* \* \*